INVENTOR
Walter L. Van Dam
BY Kenyon & Kenyon
ATTORNEYS

Patented July 1, 1952

2,601,877

UNITED STATES PATENT OFFICE 2,601,877

INDEXING PLUNGER ASSEMBLY FOR JIG SAWS OR THE LIKE

Walter L. Van Dam, Kalamazoo, Mich., assignor to Atlas Press Company, Kalamazoo, Mich., a corporation of Michigan Application July 22, 1950, Serial No. 175,345

9 Claims. (Cl. 143—73)

This invention relates to improvements in indexing plunger assemblies for jig saws or the like.

It has for an object the provision of an effective, easily-assembled plunger assembly for jig saws or the like which can be formed from stock rod and tubular materials while nevertheless providing a plurality of indexing positions of the plunger and attached jig saw blade or the like.

Another object of the invention is to provide such a plunger which can be easily and inexpensively made while nevertheless providing an adjustable assembly for varying the tension upon the cooperating jig saw blade or the like.

Other objects and advantages of the invention will appear during the course of the following detailed description when taken with the accompanying drawings, in which.

Figure 1:
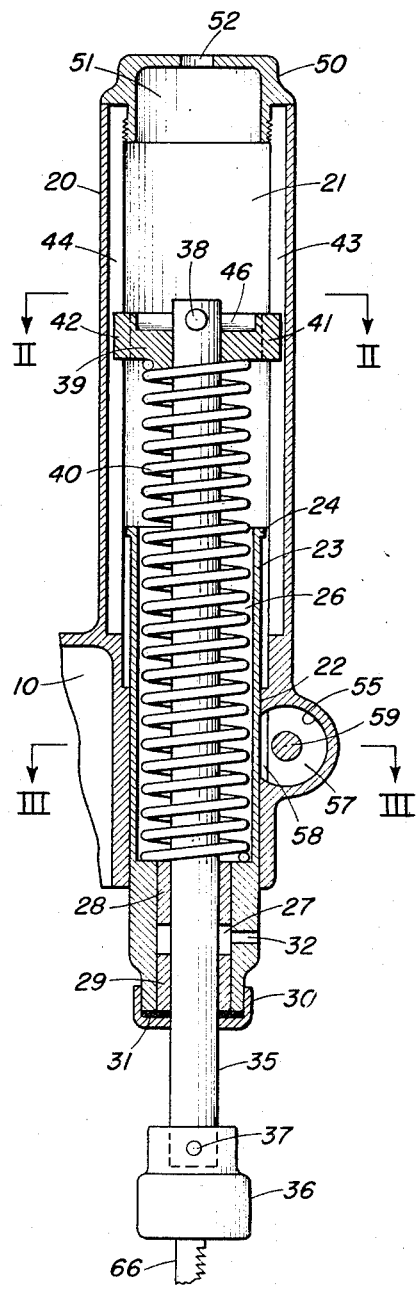
Fig. 1 is a detailed partially cross-sectional elevational view of the invention incorporated in a jig saw.

The improved plunger assembly is shown incorporated in a jig saw, the upper support of which is indicated at 10 (Fig. 1). This support extends in conventional manner over a table and base in which the driving mechanism, which is conventional and therefore not shown, is mounted.

In Fig. 1 is shown a vertically disposed longitudinal head 20 which is provided with two cylindrical bores 21 and 22 of different diameters with a tubular housing 23 slidably fitting in the lower bore 22 of lesser diameter as shown. The upper end of housing 23 is provided with a flange or lip 24 in order to limit the downward movement of housing 23 and prevent it from being withdrawn downwardly out of head 20.

Housing 23 is similarly provided with two bores 26 and 27 of different diameters as illustrated and two solid, rigid, oilless self-lubricating material guides or bearings 28 and 29 are fitted in the lower bore 27 of lesser diameter. Lower bearing or guide 29 is maintained in position in the lower bore 27 by means of end cap 30 and a felt washer 31 is provided between cap 30 and the abutting surface of lower bearing or guide 29 in order to protect the guide from dirt, saw dust, and the like, as well as retaining the oil film on the plunger surface. Oil hole 32 is provided in housing 23 and communicates with the space within bore 27 between bearings 28 and 29.

Plunger 35, which is of circular cross section, rides slidably in bearings or guides 28 and 29 which have circular bores and has secured to it at its lower end a jig saw blade chuck 36, as by means of pin 37. A second pin 38 is secured in plunger 35 adjacent the upper end thereof with its ends extending transversely from the plunger. An indexing disk 39, which has a circular bore, rides slidably and rotatably on plunger 35 below pin 38, being forced against the latter by means of coil compression spring 40 which surrounds a portion of plunger 35, abutting the lower end of upper bore 26 of houing 23 at one end and the lower surface or face of indexing disk 39 at the other.

Figure 2:
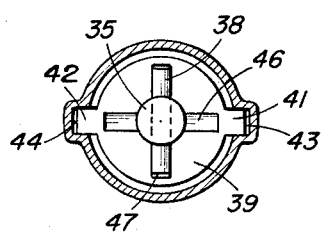
Fig. 2 is a detailed cross-sectional view taken on the line II—II of Fig. 1.

As best seen in Fig. 2, indexing disk 39 is provided with two diagonally-opposed keys or guides 41 and 42 which slide in longitudinal keyways 43 and 44 formed in head 20. Two slots 46 and 47 are formed at right angles or normal to one another in the upper surface or face of indexing disk 39 for the reception selectively of indexing pin 38. One of slots 46 and 47 is preferably disposed in line with keys or guides 41 and 42, slot 46 being illustrated in this position in Figs. 1 and 2.

Referring again to Fig. 1, cap 50 is threaded in upper bore 21 of head 20 as shown and includes an inner cup-shaped cavity 51 whose diameter is at least slightly larger than the length of indexing pin 38 but less than the diameter of the disk 39. Central vent 52 is provided in the top of cup 50 to vent the interior of head 20 to the atmosphere.

Figure 3:
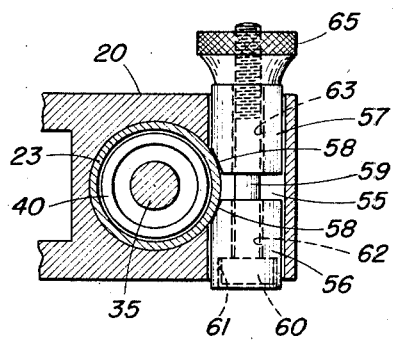
Fig. 3 is a detailed cross-sectional view taken on the line III—III of Fig. 1.

In Fig. 3 is shown the manner in which housing 23 is maintained in its longitudinally or vertically adjusted position within head 20 by a coordinate lock. Head 20 is provided with a cylindrical bore 55 at right angles to bore 22 and partially intersecting the latter. Slidably fitted in the bore 55 are cylindrical locking members 56 and 57 having beveled faces 58 to engage the housing 23. A bolt 59 has its squared head 60 fitted in the squared recess 61 of the member 56 and extends through bores 62 and 63 of locking members 56 and 57, respectively, and is engaged by the knurled nut 65, which can be tightened to pull members 56 and 57 together to wedgingly lock the housing 23 in position. To adjust the longitudinal or vertical position of housing 23 and head 20, all that is necessary is to unscrew nut 65 slightly, thus releasing the members 56 and 57 from contact with housing 23, whereupon housing 23 may be slidably moved within head 20 to adjust the tension upon the reciprocatory plunger 35 in its normal operation.

Reciprocatory plunger 35, chuck 36, and saw blade 66 are shown in Fig. 1 in that indexing position in which indexing pin 38 lies in slot 47 (Fig. 2). In the event that it is desired to have jig saw blade 60 move reciprocally at right angles to the movement provided by the arrangement shown in Fig. 1, the operator moves plunger 35 upward within head 20 until indexing disk 39 seats against the lower surface of cap 50. Further upward movement of plunger 35 will force pin 38 out of slot 47, and plunger 35 may then be rotated 90 degrees in either direction. Thus, when plunger 35 is thereafter moved downward, indexing pin 38 will seat in indexing slot 46 rather than in slot 47.

The preferred form of the invention has been described above and it will be apparent to those skilled in the art that there has thus been provided an effective and easily-assembled plunger assembly for jig saws and the like in which the plunger can be made from stock rod material, the housing can be made from stock tubular material, and standard guides or bearings may be utilized in view of the cylindrical central aperture required and the cylindrical periphery of the bearing or guide fitting into the cylindrical bore. Furthermore, with the exception of the keyways formed in the head 20 and the cooperating keys or guides of the indexing disk 39, the machining operations can be limited to simple drilling of the parts to provide the necessary bores and cavities.

It will be understood that other forms of the invention can be made without departing from the invention. For example, while in the preferred form the cap 50 shaped as shown in Fig. 1 acts as a restraining member for indexing disk 39 during the selective positioning of the indexing pin 38 in the indexing slots 46 and 47, respectively, cap 50 may be made easily removable and indexing disk 39 restrained from upward movement during the changing of the position of indexing pin 38 merely by the exercise of manual restraint thereon, as by means of one's finger inserted within the upper bore 21 of housing 20.

The scope of the invention is defined in the appended claims.

What is claimed is:

1. A plunger assembly for jig saws or the like comprising a head having a first cylindrical bore and an enlarged cylindrical bore extending upwardly therefrom in coaxial relationship, a cylindrical housing slidably fitted in said first bore for movement therein and in said enlarged bore, an outwardly-extending flange at the upper end of said housing adapted to engage the lower end of said enlarged bore to limit downward sliding movement of said housing, said housing having a cylindrical plunger-receiving bore and an enlarged spring-receiving bore extending coaxially with said plunger-receiving bore and upwardly therefrom, an indexing disk slidably disposed in the enlarged bore of said head and having a central cylindrical bore and in its upper face a pair of transverse indexing grooves, guide means for preventing rotation of said disk relative to the head, a cylindrical plunger slidably and rotatably mounted in the plunger-receiving bore of said housing and in the bore of said indexing disk and having at its lower end a chuck, a compression coil spring surrounding said plunger and having one end disposed in and engaging the bottom of the spring-receiving bore of said housing and having its other end engaging the lower face of said indexing disk, a cross pin at and projecting laterally from the upper end of said plunger and above said indexing disk and adapted to fit in either of the transverse indexing grooves of said indexing disk, a cap for the enlarged bore of said head having an inwardly projecting member positioned and adapted to engage the upper surface of said indexing disk to limit upward movement thereof when said housing, plunger and disk are slidably moved toward the upper end of said head but positioned to clear the cross pin to permit further upward movement of the plunger to raise the cross pin above the indexing disk and to permit rotation of the pin and plunger for indexing, and a lock mechanism for locking the housing in slidably adjusted position in said first bore of said head.

2. A plunger assembly for jig saws or the like comprising a head having a first cylindrical bore and an enlarged cylindrical bore extending upwardly therefrom in coaxial relationship, a cylindrical housing slidably fitted in said first bore for movement therein and in said enlarged bore, an outwardly-extending flange at the upper end of said housing adapted to engage the lower end of said enlarged bore to limit downward sliding movement of said housing, said housing having a cylindrical plunger-receiving bore and an enlarged spring-receiving bore extending coaxially with said plunger-receiving bore and upwardly therefrom, an indexing disk slidably disposed in the enlarged bore of said head and having a central cylindrical bore and in its upper face a pair of transverse indexing grooves, guide means for preventing rotation of said disk relative to the head, a cylindrical plunger slidably and rotatably mounted in the plunger-receiving bore of said housing and in the bore of said indexing disk and having at its lower end a chuck, a compression coil spring surrounding said plunger and having one end disposed in and engaging the bottom of the spring-receiving bore of said housing and having its other end engaging the lower face of said indexing disk, a cross pin at and projecting laterally from the upper end of said plunger and above said indexing disk and adapted to fit in either of the transverse indexing grooves of said indexing disk, a stop to engage the upper surface of said indexing disk to limit upward movement thereof when said housing, plunger and disk are slidably moved toward the upper end of said head but positioned to clear the cross pin to permit further upward movement of the plunger to raise the cross pin above the indexing disk and to permit rotation of the pin and plunger for indexing, and a lock mechanism for locking the housing in slidably adjusted position in said first bore of said head.

3. A plunger assembly for jig saws or the like comprising a head having a first cylindrical bore and an enlarged cylindrical bore extending upwardly therefrom in coaxial relationship, a cylindrical housing slidably fitted in said first bore for movement therein and in said enlarged bore, said housing having a cylindrical plunger-receiving bore and an enlarged spring-receiving bore extending coaxially with said plunger-receiving bore and upwardly therefrom, an indexing disk slidably disposed in the enlarged bore of said head and having a central cylindrical bore and in its upper face a pair of transverse indexing grooves, guide means for preventing rotation of said disk relative to the head, a cylindrical plunger slidably and rotatably mounted in the plunger-receiving bore of said housing and in the bore of said indexing disk and having at its lower end a chuck, a compression coil spring surrounding said plunger and having one end disposed in and engaging the bottom of the spring-receiving bore of said housing and having its other end engaging the lower face of said indexing disk, a cross pin at and projecting laterally from the upper end of said plunger and above said indexing disk and adapted to fit in either of the transverse indexing grooves of said indexing disk, and a lock mechanism for locking the housing in slidably adjusted position in said first bore of said head.

4. A plunger assembly for jig saws or the like comprising a head, a housing slidably mounted in said head and having therein a cylindrical bearing, a cylindrical plunger slidably and rotatably mounted in said cylindrical bearing, a chuck at the lower end of said plunger, and indexing member slidable in said head and having a cylindrical bore surrounding said plunger for sliding movement and rotation of the plunger therein, means restraining said indexing member against rotary motion relative to said head, cooperating, disengageable indexing means connecting the upper end of said plunger with said indexing member and disengageable by sliding movement of said plunger in said indexing member, means for locking said housing in said head, stop means carried by said housing, a compression spring surrounding said plunger and engaging said stop means and said indexing member, and stop means engageable by said indexing member on upward movement of said housing, plunger and indexing member to permit disengagement of said indexing means by further sliding movement of said plunger in said indexing member to permit rotation of said plunger for indexing.

5. A plunger assembly for jig saws or the like comprising a head, a housing slidably mounted in said head and having therein a cylindrical bearing, a cylindrical plunger slidably and rotatably mounted in said cylindrical bearing, a chuck at the lower end of said plunger, and indexing member slidable in said head and having a cylindrical bore surrounding said plunger for sliding movement and rotation of the plunger therein, means restraining said indexing member against rotary motion relative to said head, cooperating, disengageable indexing means connecting the upper end of said plunger with said indexing member and disengageable by sliding movement of said plunger in said indexing member, means for locking said housing in said head, stop means carried by said housing, and a compression spring surrounding said plunger and engaging said stop means and said indexing member.

6. A plunger assembly for jig saws or the like comprising a cylindrical plunger, means supporting said plunger slidably and rotatably, an indexing member slidably and rotatably receiving said plunger, means supporting said indexing member for slidable motion in the direction of sliding movement of said plunger and restraining said indexing member against rotation relative to said means, disengageable indexing means adapted to connect said indexing member and said plunger in non-rotatable relationship and disengageable by movement of said plunger in the direction of said indexing member, a stop to engage said indexing member to prevent sliding motion thereof while permitting further movement of said plunger to disengage said indexing means, and a spring engaging said indexing member and said supporting means for holding said indexing means in their engaged position and biasing said indexing member and said plunger when said indexing means are engaged.

7. A plunger assembly for jig saws or the like comprising a cylindrical plunger, means supporting said plunger slidably and rotatably, an indexing member slidably and rotatably receiving said plunger, means supporting said indexing member for slidable motion in the direction of sliding movement of said plunger and restraining said indexing member against rotation relative to said means, disengageable indexing means adapted to connect said indexing member and said plunger in non-rotatable relationship and disengageable by movement of said plunger in the direction of said indexing member, and a spring engaging said indexing member and said supporting means for holding said indexing means in their engaged position and biasing said indexing member and said plunger in one direction.

8. In a jig saw or the like the combination of a head having a cylindrical bore and a longitudinal guideway therein, a coiled compression spring, a cylindrical plunger housing fitting in said bore and movable longitudinally therein and having a first longitudinal bore extending for a portion thereof to receive a portion of said coiled spring and a second longitudinal bore of smaller diameter extending through the remainder thereof, a coordinate lock in said head engaging said plunger housing to restrain its movement longitudinally of the bore of said head; a plunger of circular cross section fitting slidably in said second bore of said plunger housing and having one end portion disposed without said housing and head, the other end portion disposed within said head but without said housing, and an intermediate portion surrounded by said spring, an indexing pin disposed in said plunger adjacent said other end portion normal to the longitudinal axis thereof, and an inedexer disk disposed within said head with one face abutting one end of said spring and having a central aperture to receive said plunger, a pair of grooves disposed angularly to one another in its other face to receive said indexing pin selectively, and a guide member on said disk fitting in said guideway of said head.

9. In a jig saw or the like the combination of a reciprocatory plunger of circular cross section, a guide for said plunger, a housing supporting said guide, a head in which said housing is slidably supported, a member engaging and slidable along said head and engaging and adjustably restraining said plunger against rotation relative to said head and including alternative indexing positions disposed angularly to one another for selectively fixing the angular position of said plunger relative to said head, means for keeping said plunger in engagement with said member selectively at either of said indexing positions, whereby said plunger can be fixed in a selected angular position relative to said head and a lock cooperating with said head for securing said housing longitudinally in position within said head.

WALTER L. VAN DAM.

REFERENCES CITED

The following references are of record in the file of this patent:

UNITED STATES PATENTS

| Number | Name | Date |
| --- | --- | --- |
| 1,964,652 | Tautz | June 26, 1934 |